US009973461B2

(12) United States Patent
Tomlinson et al.

(10) Patent No.: US 9,973,461 B2
(45) Date of Patent: May 15, 2018

(54) METHOD AND APPARATUS FOR TIME LIMITED MESSAGES IN PACKET COMMUNICATIONS

(71) Applicant: PQ Solutions Limited, London (GB)

(72) Inventors: Martin Tomlinson, Totnes (GB); Andersen Cheng, London (GB); Cen Jung Tjhai, Plymouth (GB)

(73) Assignee: PQ SOLUTIONS LIMITED, London (GB)

( * ) Notice: Subject to any disclaimer, the term of this patent is extended or adjusted under 35 U.S.C. 154(b) by 63 days.

(21) Appl. No.: 14/306,515

(22) Filed: Jun. 17, 2014

(65) Prior Publication Data

US 2015/0326510 A1 Nov. 12, 2015

(30) Foreign Application Priority Data

May 12, 2014 (GB) .................................. 1408408.1

(51) Int. Cl.
*H04L 12/58* (2006.01)
(52) U.S. Cl.
CPC .............. *H04L 51/18* (2013.01); *H04L 51/04* (2013.01); *H04L 51/34* (2013.01)
(58) Field of Classification Search
CPC ......... H04L 51/34; H04L 51/04; H04L 51/32; H04L 51/36; H04L 51/38; H04L 51/18; H04L 51/12; H04L 51/10; H04L 51/063
(Continued)

(56) References Cited

U.S. PATENT DOCUMENTS 6,324,569 B1 * 11/2001 Ogilvie ................ G06Q 10/107
709/206
6,701,347 B1 * 3/2004 Ogilvie ................ G06Q 10/107
709/202
(Continued)

FOREIGN PATENT DOCUMENTS

CN 101552737 A * 10/2009 ............. H04L 51/04
CN 1941698 B * 8/2010 ........... G06Q 10/107
(Continued)

OTHER PUBLICATIONS

Tsai-Yeh Tung; Lin, L.; Lee, D.T., "Pandora Messaging: An Enhanced Self-Message-Destructing Secure Instant Messaging Architecture for Mobile Devices," in Advanced Information Networking and Applications Workshops (WAINA), 2012 26th International Conference on , vol., No., pp. 720-725, Mar. 26-29, 2012.*
(Continued)

*Primary Examiner* — Kostas Katsikis
(74) *Attorney, Agent, or Firm* — Morris & Kamlay LLP (57) ABSTRACT

Systems and methods are provided for direct packet communications and store and forward packet communications including packets which have attributes which determine the lifetime of the packet contents and these lifetimes are optionally a function of the recipient. Example methods are given featuring the transmission of packets with limited lifetime, the storing and retransmission of packets to one or more recipients and confirmation of deletion of packet contents. It is also shown that cryptography may be employed to ensure that timed presentation of packet contents to recipients takes place and is authenticated by the sender.

24 Claims, 6 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 7,120,455 | B1 * | 10/2006 | Chen ..................... | H04L 12/581 455/414.1 |
| 7,624,416 | B1 * | 11/2009 | Vandermolen ......... | H04H 60/33 709/203 |
| 7,716,294 | B2 * | 5/2010 | Lyle ...................... | G06Q 10/107 709/206 |
| 7,921,174 | B1 * | 4/2011 | Denise ................. | G06Q 10/107 709/206 |
| 2003/0134678 | A1 * | 7/2003 | Tanaka .................... | G06F 3/048 463/42 |
| 2004/0054908 | A1 * | 3/2004 | Circenis ................. | G06F 21/10 713/176 |
| 2004/0199580 | A1 * | 10/2004 | Zhakov ............... | H04L 12/1818 709/204 |
| 2004/0249900 | A1 * | 12/2004 | Karstens ............... | H04L 12/581 709/207 |
| 2004/0254998 | A1 * | 12/2004 | Horvitz ................ | G06Q 10/107 709/206 |
| 2005/0080866 | A1 * | 4/2005 | Kent, Jr. ............. | G06Q 10/107 709/207 |
| 2005/0198147 | A1 * | 9/2005 | Pastro ................... | H04L 12/581 709/206 |
| 2006/0036740 | A1 * | 2/2006 | Hagale ................. | G06Q 10/107 709/227 |
| 2006/0256959 | A1 * | 11/2006 | Hymes .................. | H04M 1/26 379/433.04 |
| 2007/0064899 | A1 * | 3/2007 | Boss ........................ | H04L 51/04 379/201.01 |
| 2007/0073823 | A1 * | 3/2007 | Cohen .................. | G06Q 10/107 709/207 |
| 2007/0143417 | A1 * | 6/2007 | Daigle ................. | G06Q 10/107 709/206 |
| 2007/0143435 | A1 * | 6/2007 | Daigle ................. | G06Q 10/107 709/207 |
| 2007/0283403 | A1 * | 12/2007 | Eklund, II ............... | G09B 5/06 725/117 |
| 2008/0028027 | A1 * | 1/2008 | Jachner .................. | H04L 51/04 709/206 |
| 2008/0186926 | A1 * | 8/2008 | Baio ....................... | G06Q 30/02 370/338 |
| 2008/0256189 | A1 | 10/2008 | Lyle et al. | |
| 2008/0256190 | A1 * | 10/2008 | Ryan .................... | H04L 12/1831 709/206 |
| 2009/0042588 | A1 | 2/2009 | Lottin et al. | |
| 2009/0094329 | A1 * | 4/2009 | Ambati .................. | G06Q 10/10 709/204 |
| 2009/0094632 | A1 * | 4/2009 | Newnam ............ | H04N 7/17318 725/24 |
| 2009/0248751 | A1 | 10/2009 | Myman et al. | |
| 2010/0099445 | A1 * | 4/2010 | Song ................. | H04M 1/72552 455/466 |
| 2011/0161507 | A1 * | 6/2011 | O'Sullivan ........... | H04L 12/581 709/228 |
| 2011/0302414 | A1 * | 12/2011 | Logan ..................... | G06F 19/321 713/168 |
| 2011/0317684 | A1 * | 12/2011 | Lazzaro ................. | G06Q 30/04 370/352 |
| 2013/0018960 | A1 * | 1/2013 | Knysz ................... | H04L 65/403 709/204 |
| 2013/0173531 | A1 * | 7/2013 | Rinearson ......... | G06F 17/30011 707/608 |
| 2014/0032682 | A1 * | 1/2014 | Prado ...................... | H04L 51/34 709/206 |
| 2014/0067950 | A1 * | 3/2014 | Winograd ............. | H04L 67/306 709/204 |
| 2014/0214504 | A1 * | 7/2014 | Young .................. | G06Q 10/109 705/14.5 |
| 2014/0344720 | A1 * | 11/2014 | Kumashio ................ | H04N 7/15 715/753 |
| 2015/0200879 | A1 * | 7/2015 | Wu ....................... | H04L 51/046 715/758 |
| 2016/0205340 | A1 * | 7/2016 | Jang ....................... | H04N 5/919 348/14.02 |
| 2017/0046646 | A1 * | 2/2017 | Wakefield ........ | G06Q 10/06314 |
| 2017/0337195 | A1 * | 11/2017 | Rinearson ............ | G06Q 10/101 |

FOREIGN PATENT DOCUMENTS

| | | | |
|---|---|---|---|
| CN | 101964942 A | * | 2/2011 |
| JP | 2007095074 A | * | 4/2007 |
| WO | 2009/078870 A1 | | 6/2009 |

OTHER PUBLICATIONS

GB Search and Examination Report dated Jul. 2, 2014 issued in GB1408408.1.
GB Search Report dated Feb. 25, 2015 issued in GB1408408.1.

* cited by examiner

METHOD AND APPARATUS FOR TIME LIMITED MESSAGES IN PACKET COMMUNICATIONS

FIELD OF THE INVENTION

This invention relates to data communication, and more particularly to systems and methods for computer-based instant messaging communications.

BACKGROUND OF THE INVENTION

In the modern day electronic age, there are many practical examples of packet communications. With increasing emphasis on security, there is a need to limit the risk of information sent using packet communications falling into the wrong hands.

Instant messaging ("IM") systems and applications are well-known, in which data messages are exchanged between users in real-time. Instant messaging systems are also known in which transmitted information is deleted after a given time interval.

For example, U.S. Pat. No. 8,676,929 (Lazaridis) discusses a system and method aimed at causing advertisements to potential customers to appear at different times, citing restaurant advertisements to appear around mealtimes.

U.S. Pat. No. 8,650,256 (Chakra et al.) discusses a method in which information is only displayed to the recipient when the recipient is off-line so as to prevent forwarding of the information to a third party. After a given time the information is deleted.

U.S. Pat. No. 7,461,378 (Beyda) discusses instant messages being received by a device and if a message is unread by the recipient after a given period of time the message is deleted.

US20140032682 (Prado et al.) discusses a deficiency in off the record instant messaging in that if a recipient is off-line at the time of transmission, the message is lost and never received. In their method off the record messages are stored in non-durable memory on a server until a recipient is back on line or a predetermined time has expired. Either way the messages expire from the server.

U.S. Pat. No. 7,464,139 (Malik) discusses a method in which emails are sent to a recipient's device and if the recipient fails to open the email within a given time period the email is deleted from the recipient's device and as an option an alternative message is displayed.

In U.S. Pat. No. 7,797,390 (Hagale et al.), received messages by one or more recipients are not stored but displayed, such that they are non-editable, that is not able to be copied or forwarded, for a predetermined duration only.

A common deficiency of the prior art is that all recipients are treated in the same manner, whereas in many instances there is a requirement that recipients be treated differently. For example, in a national security context, recipients have different security clearances. In a commercial context, recipients may be in different locations with varying risks of message interception.

There is therefore a need for a technique to address the aforementioned problems with instant messaging and provide for more robust and adaptive transmission, display and management of content within IM conversations.

STATEMENTS OF THE INVENTION

Aspects of the present invention are set out in the accompanying claims.

According to one aspect of the present invention, a method is provided by which the time duration of received packet information before the information is denied to the recipient is a function of several attributes contained in the received data message, as well as attributes of the recipient including the ID or location of the recipient.

According to another aspect, the present invention provides a method in which a data message containing information is transmitted from a user's device to one or more recipients and said data message also contains one or more attributes which determine the lifetime of some of the data message contents and in which some or no attributes of a recipient's device also determine the lifetime of some of the data message contents.

The data message attributes may be one or more of the: type of information contained, encryption key, decryption key, document, diagram, image, audio recording, video recording or other type of information, the quantity of information contained in the data message, a parameter specifying a minimum or maximum lifetime, the geographic location of the sender, the ID of the sender.

An attribute of a recipient's device that determines the lifetime of some of the received data message contents may be one or more of: the ID of the recipient, an attribute derived from the ID of the recipient, and the geographical location of the recipient.

When one or more recipients are online, the lifetime of some of the data message contents may be determined solely by the recipient's device.

An attribute may be used to determine the length of time some of the data message contents are revealed to the recipient and the starting time of said revealing is synchronised across all recipients.

An attribute may be used to determine the length of time some of the data message contents are revealed to the recipient and the starting time of said revealing is determined by the reception of a decryption key which is used to decrypt some of the data message contents.

When one or more recipients are offline, the data message may be stored on one or more servers until such time that either the recipients become online and subsequently receive the data message sent by said servers in which case the lifetime of some of the data message contents is determined by the recipient's device or the time spent stored on a server exceeds the lifetime of some of the data message contents in which case said contents may be deleted by said servers.

The attributes which determine the lifetime of some of the data message contents may be decrypted by the sender by using the sender's private key prior to the data message being sent so that the sent data message contains decrypted attributes and in which the recipients of the received data message encrypt the decrypted attributes using the sender's public key in order to authenticate the resulting attributes which determine the lifetime of some of the received data message contents.

According to yet another aspect, the present invention provides a method of providing instant messaging communication between users via a communication network, comprising transmitting a data message from an instant messaging client at a user device of a first user to an instant messaging client at a user device of a second user, the data message having a content portion and an associated attribute identifying a display duration for the content portion; determining that a predefined action with the received content portion has occurred at the user device of the second user; determining a remaining display duration for the content portion of the data message, after said predetermined action is determined to have occurred; and displaying an indication of the remaining display duration for the content portion by both instant messaging clients. The data message may be transmitted to a plurality of instant messaging clients at a respective plurality of user devices of a respective plurality of users.

The content portion of the data message may comprise one or more of text data, image data, audio data, video data and encoded data, or combinations thereof. The instant messaging clients may be configured to determine that the data message is expired based on the defined display duration, and to remove the content portion of the expired data message. The instant messaging clients may comprise a user interface for displaying a plurality of sequential data messages of a conversation, wherein a footprint of an expired data message is retained in the displayed conversation.

Synchronisation of the remaining display duration at all of the instant messaging clients may be maintained by a remote messaging server.

The predefined action may comprise one of: displaying the content portion in a message display region of the instant messaging client, initiating playback of an audio or multimedia content portion, or determining that playback of an audio or multimedia content portion has finished.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

A specific embodiment of the invention will now be described for an example method of sending a data message from a source device, the data message including several attributes which are used by one or more recipient's device (s) or attributes of a recipient's device to determine the lifetime of some of the data message contents on a recipient' device(s). In case any recipient is off-line when the data message is sent, the data message is stored by one or more servers until the recipient is next online at which point the data message is communicated by the server to the recipient. In some embodiments the time spent stored on a server by the data message will be determined and depending on the attributes contained in the data message, the data message will be deleted by the server regardless of whether the data message has been sent to all recipients.

Figure 1:
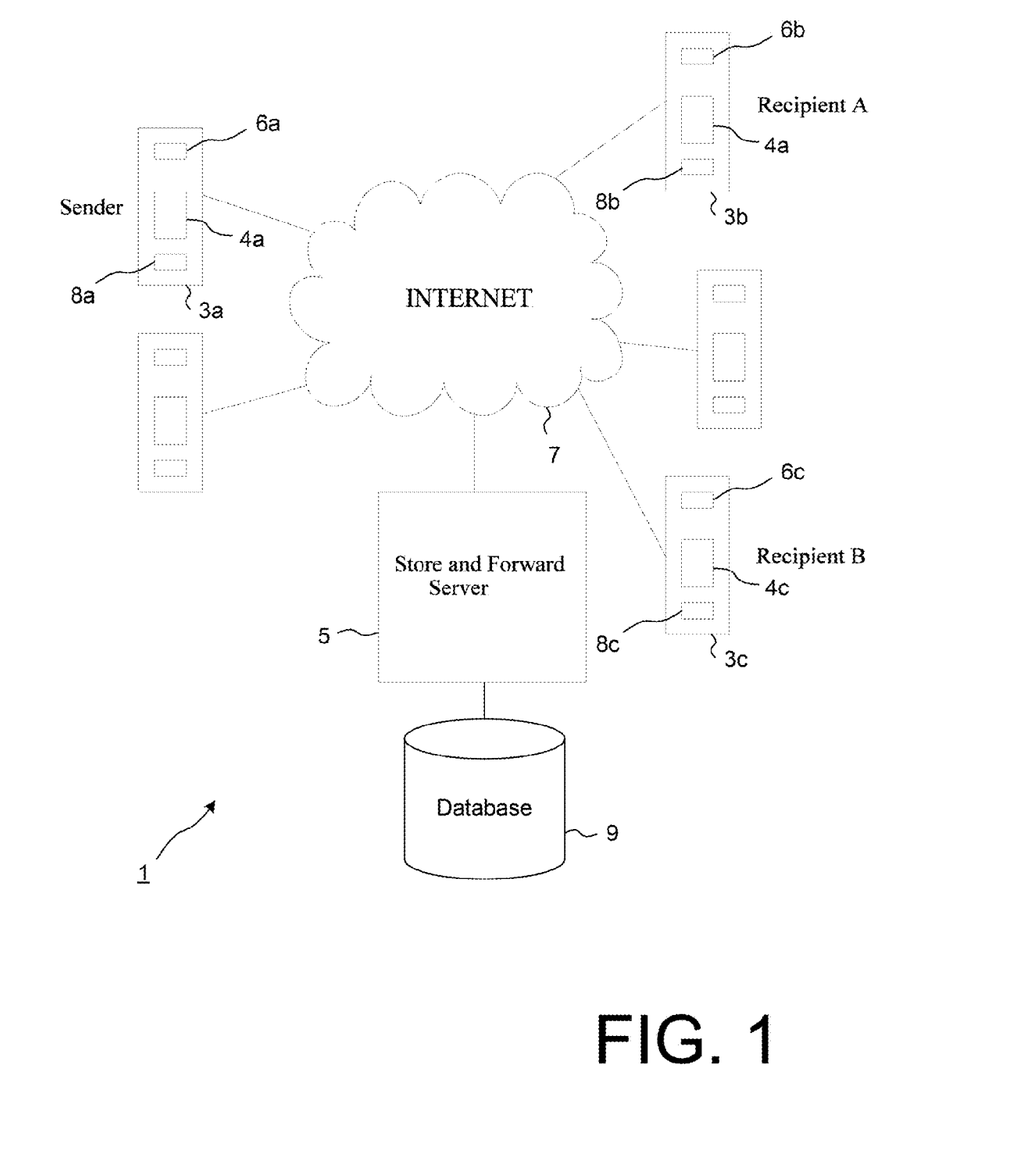
FIG. 1 is a block diagram showing the main components of a data communication system according to an embodiment of the invention.

Referring to FIG. 1, a data communication system 1 according to the present exemplary embodiment comprises a first user device 3a in communication with at least one other user device 3b, 3c via a store-and-forward server 5 and a data network 7. The user devices 3 are associated with respective registered users of the system 1, the server 5 storing data identifying each registered user in a database 9. The devices 3 execute respective instant messaging client applications (or software modules) 4, having a user interface for the user to compose and transmit data messages to other users, and for displaying transmitted and received data messages of an IM conversation.

The devices 3 may be of a type that is known per se, such as a desktop computer, laptop computer, a tablet computer, a smartphone such as an IOS™, BLACKBERRY™, or ANDROID™ based smartphone, a 'feature' phone, a personal digital assistant (PDA), or any processor-powered device with suitable input 6 and display means 8. The data network 7 may comprise a terrestrial cellular network such as a 20, 30 or 40 network, a private or public wireless network such as a WiFi™-based network and/or a mobile satellite network or the Internet. It will be appreciated that a plurality of devices 3 are operable concurrently within the system 1.

Figure 2:
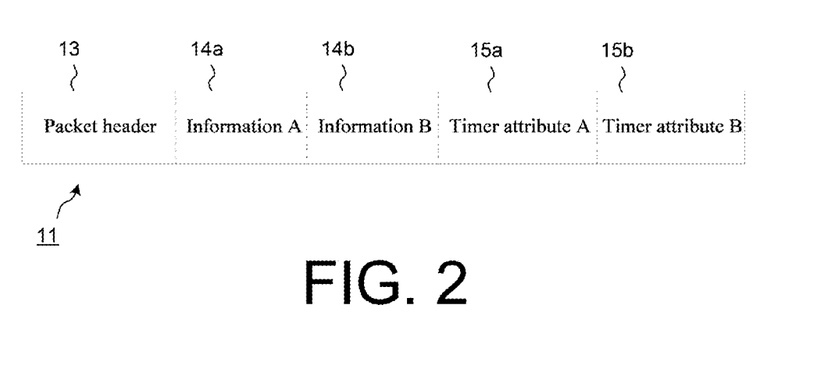
FIG. 2 is a block diagram schematically illustrating the format of an exemplary data message.

For the purposes of describing the exemplary process of the present embodiment, the first user device 3a is associated with a sender using the device 3a to send information to one or more recipients using similar devices 3b, 3c. Preferably, the information is packetised into one or more data packets, according to a predefined format. FIG. 2 schematically illustrates an example of the format of an exemplary data message 11 that is generated by the instant messaging clients 4 in the present embodiments. Typically, the data messages 11 are composed of bits transmitted by the sender device 3a. A header 13 of the data message 11 can comprise codes that uniquely represent the network addresses of the sender and the recipient devices 3. The information content of the data message 11 is provided in one or more body portions 14a, 14b. The sender's address identifies to the recipients who sent the data message. The recipients' addresses informs the system 5 indirectly how to route the data messages 11 through the data network 7 so that it may be delivered to each recipient device 3b, 3c.

The server 5 shown in FIG. 1 is configured to communicate with all user devices 3 and so knows which users and devices 3 are online, that is those that have communications ability to send and receive data messages and those devices 3 which are offline and temporarily are unable to send and receive data messages. It is appreciated that the client 4 user interfaces may enable users to set their own presence state that will be seen by other users, such as online, offline, busy, etc. Considering as an example the case where the Sender's device 3a shown in FIG. 1, which is online, wants to send a data message to both Recipient A and Recipient B. Recipient A's device 3b is online and Recipient B's device 3c is offline. The server 5 is able to communicate with all online devices 3 and so the Sender's device 3a knows that Recipient A's device 3b is online and Recipient B's device 3c is offline. Accordingly, the Sender's device 3a sends the data message directly to Recipient A's device 3b, or indirectly to Recipient A's device 3b via the server 5. Knowing that Recipient B's device 3c is offline, the Sender sends the data message to the server 5 where the data message is stored until Recipient B's device 3c becomes online and then the data message is sent by the server 5 to Recipient B's device 3c. The data message is deleted from memory 9 in the Store and Forward server 5 once the server 5 is confident the transmitted packet or packets for the data message 11 have been received by Recipient B's device 3b.

It is appreciated that in the context of IM conversations, the participating users of the conversation may act as both a sender of one or more data messages to another user, as well as a recipient of one or more data messages from the same or another user, via the user's instant messaging client 4.

In the present embodiment, the instant messaging clients 4 enable the transmission and display of data messages containing information or content that is time sensitive, as informed to the server 5 by attributes contained in the associated data message. As will be described in more detail below, the present embodiment provides a more flexible technique for applying a user-defined display duration to respective data messages, and for enabling accurate countdown synchronisation between the sender and the recipient instant messaging clients 4. In one embodiment, the data messages are determined to expire based on a display duration value defined for the respective data message. For example, the display duration attribute may be a defined length of time for the content of the data message to be displayed by the instant messaging client 4.

Figure 4:
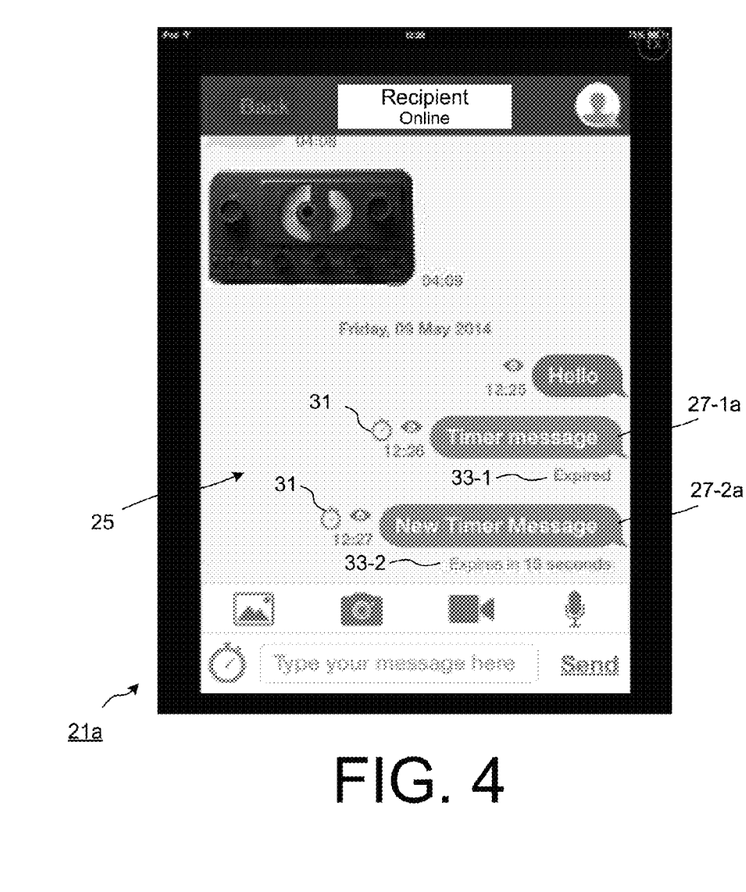
FIGS. 4 to 8 are exemplary display screens of an instant messaging client according to embodiments of the present invention.

FIGS. 4 to 8 are exemplary display screens of sender and recipient instant messaging clients 4 according to embodiments of the present invention. FIG. 4 shows an exemplary user interface 21a of a sender's instant messaging client 4a, displaying a sequence of data messages 11 of an IM conversation within a message display portion 25. As shown in FIG. 4, two of the displayed data messages 27 that have been transmitted to the Recipient include an indication 31 that they are timed data messages, in this example a clock icon. A first timed message 27-1 includes a timer indication 33-1 identifying the message as expired, and a second timed message 27-2 includes a timer indication 33-2 identifying the remaining time before the associated displayed information content will expire.

Figure 5:
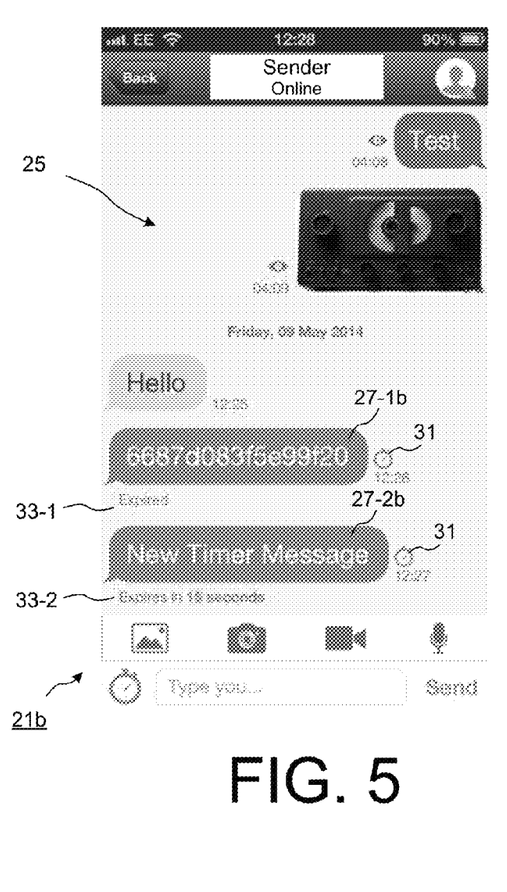

FIG. 5 shows an exemplary user interface 21b of a recipient's instant messaging client 4b, in which corresponding received data messages 27 are displayed by the client 4b. The corresponding first data message 27-1b is Displayed by the Recipient's Instant Messaging Client 4b with the indication 31 that it is a timed data message and the timer indication 33-1 identifying the message as expired. Additionally, in this example the content of the expired data message is replaced with a predefined text element, such as a digital signature of the sender as shown in FIG. 5. The corresponding second data message 27-2b is also displayed by the recipient's instant messaging client 4b with the indication 31 that it is a timed data message and the associated timer indication 33-2 identifying the remaining time before the associated displayed information content will expire. As will be described in more detail below, the countdown timers 33-2 displayed by both sender and recipient instant messaging clients 4 are synchronized and identify the same remaining lifetime value for the corresponding timed data messages 27-2.

Figure 6:
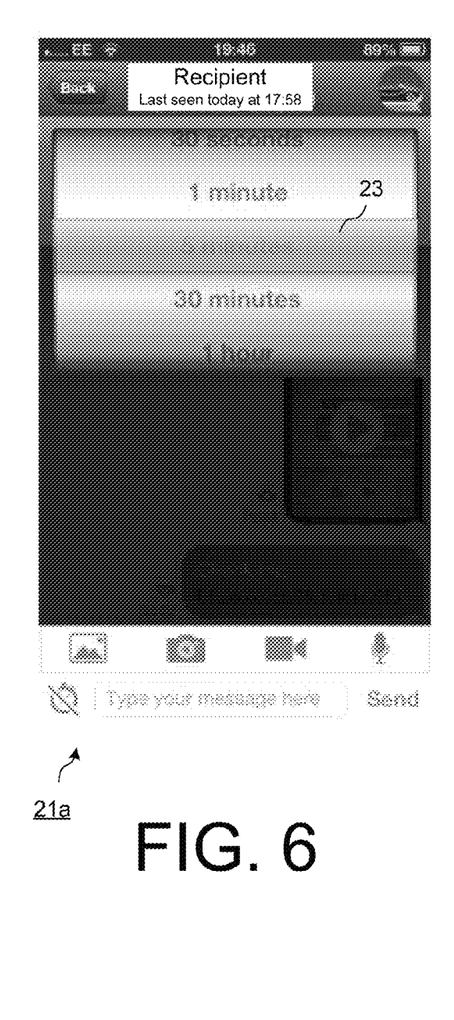

FIG. 6 shows a further exemplary display screen, illustrating that the user interface 21 of the instant messaging clients 4 can enable the Sender to select or define a value 23 for the display duration attribute for each transmitted data message, if desired. Alternatively or additionally, a default display duration value may be applied to each transmitted data message.

In other embodiments, the lifetime of a data message can instead be determined as a function of time dependent on the attributes contained in the received data message. For example, the instant message clients 4 can be configured to initialize and start a timer countdown based on the type of content in a particular data message 11. For text and image content, the countdown can start when the data message is displayed and appears on the chat screen. For audio content, the countdown can start when the audio clip starts or finishes playing. For video and multimedia content, the countdown can start when the recipient either initiates play back of the video, leaves the video play back screen part way through, or when play back of the content has finished. Additionally or alternatively, other attributes stored on the device such as the status or ID of the recipient may be used in conjunction with the data message attributes to determine the lifetime of some or all of the contents of the received data message stored on the recipient's device.

Figure 7:
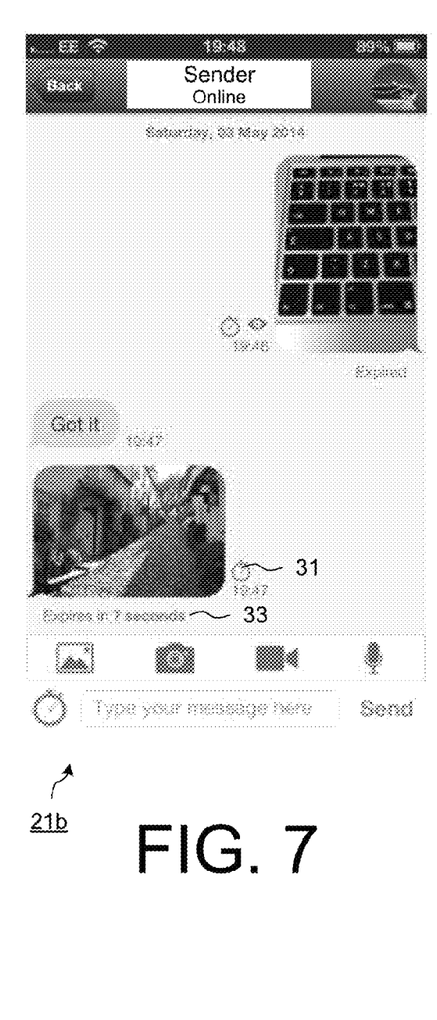
Figure 8:
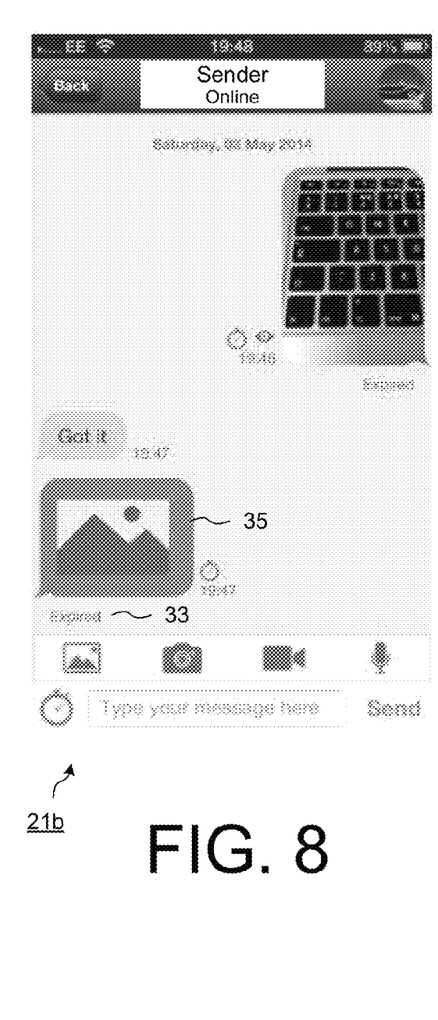

The information contained in the expired data message may be deleted from the server's memory 9 before such time that Recipient B's device 3c becomes online. In such cases, when Recipient B's device 3c becomes online, the partially erased data message may be sent to Recipient B's device 3c so that Recipient B is aware of the information deletion. The respective instant messaging clients can be configured to display a footprint for the expired message within the displayed IM conversation 25, providing an indication that a data message had been transmitted but expired after a defined time duration. FIG. 7 shows an example of an IM conversation displayed by a recipient's instant messaging client 4, in which a data message 11 including an image file is received and displayed with an indication 31 that it is a timed data message, and a timer indication 33 of the remaining time before the information content will expire. FIG. 8 shows an example of the IM conversation in which a message footprint 35 is displayed for the data message having a timestamp of 19:47 after it is determined to have expired. Alternatively, the entire data message may be deleted from the server's memory 9 so that Recipient B is not aware of the data message deletion and expiry. The deletion of some of the contents of a data message implies that said contents has a finite lifetime.

In this way, the Sender is able to set different values for the attributes for the data message sent to Recipient A compared to those in the data message sent to Recipient B, so that in the event that both Recipient A and Recipient B are offline, the server 5 may delete the information contained in the data message stored for forwarding to Recipient A at a different time than the event where some of the contents of the data message stored for forwarding to Recipient B's device 3c are deleted.

Additionally or alternatively, the deletion of some or all of the data message contents may take place on the recipient's device, for example as a function of time dependent on the attributes contained in the received data message.

Regardless of whether the lifetime of some or all of the contents of a received data message is determined by the Store and Forward server 5 or a recipient's device 3b, 3c, there may be several attributes that determine said lifetime. In the example of the data message format shown in FIG. 2 there are two such attributes, Timer attribute A 15a and Timer attribute B 15b. As examples, Timer attribute A 15a may be used to indicate the type or types of information contained in a body portion 14 of the data message 11, such as an encryption key, decryption key, document, diagram, image, audio recording or video recording, etc. Timer attribute B 15b may indicate a security status or geographical location of the recipient and/or device 3b, 3c. It will be appreciated that the data message 11 may contain any number of timer attributes. In some embodiments, a timer attribute 15 may be linked to the size of the data message 11, since this affects the amount of memory storage needed to accommodate stored data messages on the server 5 and on the recipient's device 3b, 3c.

Following deletion of some or all of the contents of a data message 11 by the Store and Forward server 5 or by the recipient device 3b, 3c, one or more data messages may be subsequently generated and transmitted back to the sender to inform him or her that said deletion has taken place.

Additionally or alternatively, data messages 11 may be sent to multiple recipients with the aim that the recipients see the contained information for the same length of time. A timer attribute 15 in each data message 11 identifies the time limit of the information following the event in which an attribute of each recipient's device 3b, 3c indicates said information is being displayed. As a further alternative, a timer attribute 15 in each data message 11 can define an absolute starting time that said information shall be displayed by the instant messaging client, such that before this time the recipient will not be able to view said information contained in the received data message 11. Optionally, it may be desired that all recipients are synchronised in their viewing of said information, in which case another timer attribute 15 conveys the time the data message was sent, and when the data message 11 is received, the identified time of sending can be compared to the system time indicated by the recipient's device 3b, 3c, so that a time offset error may be calculated. The information contained in the data message 11 can be displayed by the instant messaging client on the recipient's device 3b, 3c when the time indicated by the recipient's device is equal to said absolute starting time minus said time offset error. In this way, the system 1 ensures that the information will be displayed on each recipient's device 3b, 3c at the same time. In further options in the event that some recipients are offline, the information will not be displayed on any recipient's device until such time as all recipients are online, or a given percentage of recipients are online or a fixed point in time has been passed. These options can be implemented by means of command and status messages transmitted between the recipient devices 3b, 3c, the server 5 and the sender device 3a, the messages including data identifying that a respective event or action has occurred, along with a timestamp of the occurrence. It is appreciated that other forms of synchronisation techniques may be instead be used to synchronise the recipients' devices 3b, 3c so that the contained information in received data messages may be displayed at the same starting time. It is further appreciated that the server 5 may be configured to maintain synchronization of the timer attributes 15 of respective data messages 11 for devices 3b, 3c of recipients that are offline, where data can only be transmitted by the server 5 to the devices 3b, 3c after the recipient becomes online.

In an alternative embodiment, the starting time is determined based on the time at which the received information contained in the data message 11 is actually displayed by the instant messaging client on the recipient's device 3b, 3c. It is appreciated that an IM conversation typically comprises a plurality of received data messages in sequence, often requiring the user to scroll through the list of received data messages as displayed in the display portion of the instant message client. Advantageously, the present alternative embodiment facilitates further control of the determined lifetime of a data message, by monitoring for actual display of the received information content to the recipient before initializing a timer count down for the associated data message.

In yet a further alternative embodiment, the display time of said information may not be the same for all participants because it is desired that recipients of higher status by virtue of higher paid subscription, age, location or some disadvantage due to a disability for example. There may be any number of reasons and these differentiators between recipients will be indicated by attributes contained in the received data messages or attributes stored on each recipient's device.

In the above embodiments, attributes contained in the received data messages 11 that can affect or be used to determine the lifetime of contained information or the starting time and end time of the display of said information on a recipient's device may include the geographical location, unique identification or user ID, and/or any other relevant characteristic or derived characteristic of the sender and/or device 3a. Attributes of the recipient's device 3b, 3c that can affect or be used to determine the lifetime of said information or the starting time and end time of the display of said information on a recipient's device may include the geographical location, unique identification or user ID, and the status of the recipient and/or device 3b, 3c. A set time limit, a maximum time or a minimum time may be determined or directly specified by a timer attribute parameter or by other data message time attribute or one or more attributes of the recipient's device 3b, 3c or a combination thereof.

In a further alternative embodiment, cryptography is employed so that it almost impossible for a recipient to gain an advantage by displaying or otherwise access any sent information ahead of other recipients. In such an embodiment, the information contained in sent data messages 11 is encrypted using an encryption key that is unknown to the recipients. An example of a suitable encryption method is the Advanced Encryption Standard (AES), as defined in Federal Information Processing Standards Publication 197, United States National Institute of Standards and Technology (NIST), Nov. 26, 2001. AES is an example of symmetric encryption system where there is a secret key that is used to encrypt information and the same key is used to decrypt the information. There are also asymmetric encryption systems where the encryption key cannot be used for decryption. A different, secret key is used for decryption. RSA is such an example, as discussed in "A Method for Obtaining Digital Signatures and Public-Key Cryptosystems", R. Rivest, A. Shamir and L. Adleman Communications of the ACM 21 (2): 120-126, 1978. Either symmetric or asymmetric key encryption may be used in these embodiments. The decryption key is withheld from the recipients so that although the recipients may have received the data messages 11 containing said information, it is impossible for them to access the information without the decryption key or breaking the encryption system. At a suitable time, a data message 11 containing the decryption key together with one or more timer attributes 15 is sent, possibly simultaneously, to each intended recipient. The system 1 then operates as in the embodiments discussed above. Encrypting the said information ensures that is almost impossible for intended recipients to access the information prior to the decryption key being sent.

Figure 3:
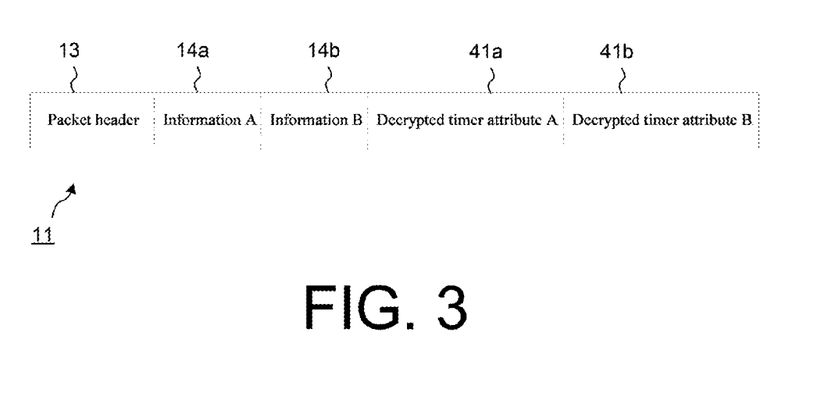
FIG. 3 is a block diagram schematically illustrating the format of an exemplary data message that is configured for the sender to authenticate the timer attributes.

In yet a further alternative embodiment, the data message timer attributes 15 are digitally signed by the sender so that recipients can be sure the data message timer attributes 15 are associated with the true ID of the sender, and more generally that the received data messages 11 are genuine. In certain applications of the present embodiments, recipients need to be certain that they have complied with rules or laws pertaining to time sensitive information. An example of a data message 11 format featuring signed timer attributes 41 is shown in FIG. 3. A public key encryption system such as RSA, is employed. The sender securely holds the private key, which is used as the decryption key in public-private key-based cryptography systems. The recipients are in possession of the sender's public key. Prior to being transmitted in data messages 11, the timer attributes 41 are decrypted by the sender device 3a using his or her private key and it is the decrypted timer attributes 41 that are contained in the transmitted data messages 11 as shown in FIG. 3. Following data message 11 reception, the recipient devices 3b, 3c encrypt the received timer attributes 41 using the sender's public key to retrieve the timer attribute information. The recipients know at this stage that the only person who could have sent the data message is the sender because no one else is in the possession of the sender's private key. Consequently the recipients may conclude that the timer attribute information genuinely originated from the sender.

Figure 9:
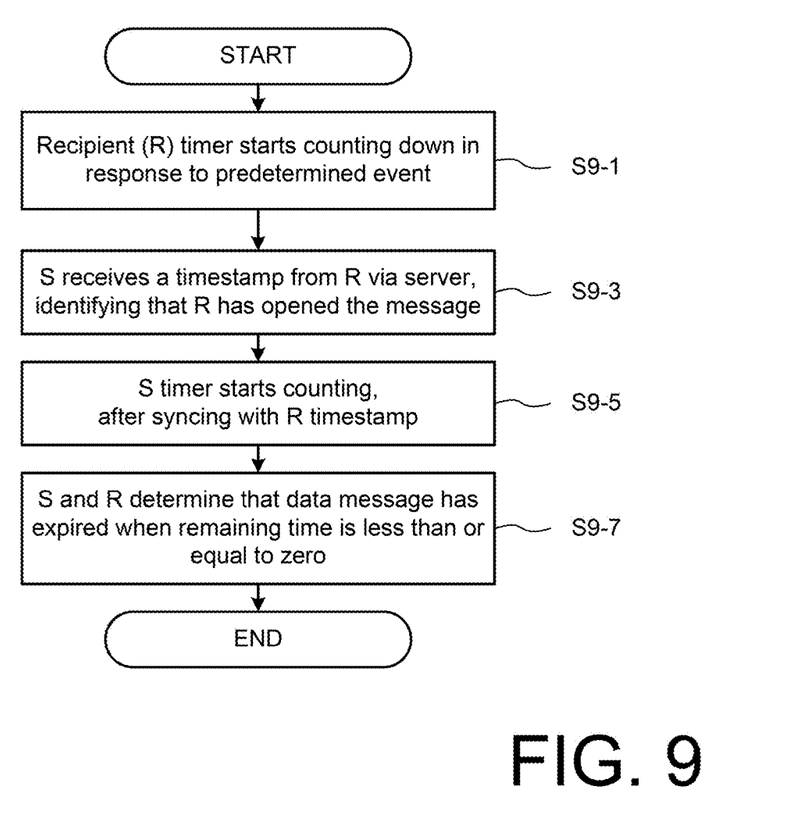
FIG. 9 is a flow diagram of a synchronization computation process according to an embodiment of the invention.

FIG. 9 is a flow diagram of an exemplary process for determining a lifetime or expiry time for received information content of a data message. The process begins after an instant messaging client of a recipient device 3b, 3c has received a data message from a sender device, sender device 3a. At the sender side, a data message timer will have been initiated for the transmitted message by the sender's device 3a, but the timer will not have started counting down. As shown in FIG. 9, at step S9-1, the recipient device 3b, 3c initiates a corresponding timer that starts counting down when the data message is opened by the recipient or actually displayed within the message display portion 25 of the instant messaging client user interface, regardless of the sender's online/offline status. As discussed above, alternatively or additionally, the timer can be configured to dynamically start the count down based on the type of data in the data message. For example, the timer can start immediately when a text message or a photo is displayed on the chat screen. For an audio clip, the timer can start only when the instant messaging client has finished playing the audio. For a video clip, the timer can start when the instant messaging client has finished playing the video or in response to user input received by the instant messaging client indicating that the recipient has terminated play back of video. A subsequent message status update for the particular data message 11 is transmitted by the recipient device 3b, 3c back to the server 5, the message status update including an identifier of the associated data message 11 and a data value identifying a timestamp when the data message was opened or actually displayed.

At step S9-3, the sender's device 3a receives the timestamp from the recipient's device 3b, 3c in the message status update via the server 5, identifying for example that the recipient has opened or viewed the information content of the received data message 11. It is appreciated that the server 5 may be further configured to modify the timestamp to take into account identified server delays for the message to come back to the Sender, to more accurately maintain the true synchronisation of data messages between the device 3 clocks and the server 5 clock. This modification is particularly advantageous when the system 1 is extended to include multiple servers 5 and/or server geographical locations. At step S9-5, the sender device 3a timer starts counting down, after a synchronization computation with the recipient device 3b, 3c timestamp, for example using the following formula:

Remaining Time=(Original time to expiry)−(Delay of sender device receiving notification from the recipient device that the message has been opened)

In other words, the remaining lifetime or time before the data message content expires is calculated as the difference between the timestamp of sender device 3a receiving notification that the recipient device 3b, 3c has opened the message, and the timestamps of the recipient device 3b, 3c opening the message. It is appreciated that the remaining time is subject to a minimum value of zero if the delay is more than the original set time, as the remaining time cannot be negative. In such an instance, the timer on the Sender screen should be set to Expired, as illustrated at step S9-7. For example:

Remaining Time=15 seconds−delay of 2 seconds=13 seconds

Remaining Time=15 seconds−18 seconds=0 seconds left on the Sender screen (i.e. the data message is expired)

In the present embodiment, when it is determined that the Remaining Time is zero or the timer on the Sender screen is set to Expired, the sender's device 3a sends a command message to the one or more recipient devices 3b, 3c to delete the message content of the expired data message. The command message can be transmitted to the one or more recipient devices 3b, 3c directly or via the server 5. Alternatively, each recipient's device 3b, 3c can take the action to delete the message content of the expired data message.

It is appreciated that the above calculations can be reversed when it is more important to synchronise the sender's message timestamp than the timestamp when the receiver opens or views the data message. One example of such an instance is when the sender is broadcasting information content considered to be scarce or perishable, and the recipient or recipients need to use the sender's timestamp as the reference point to avoid future disputes. The synchronization computation may then be based on the following formula:

Remaining Time=(Original time to expiry)−(Delay of the recipient device opening the message sent by sender device)

In other words, the remaining lifetime or time before the data message content expires is calculated as the difference between the timestamp of the recipient device 3b, 3c opening the message, and the timestamp of sender device 3a sending the message. Again, the remaining time is subject to a minimum value of zero if the delay is more than the original set time.

Computer Systems

Figure 10:
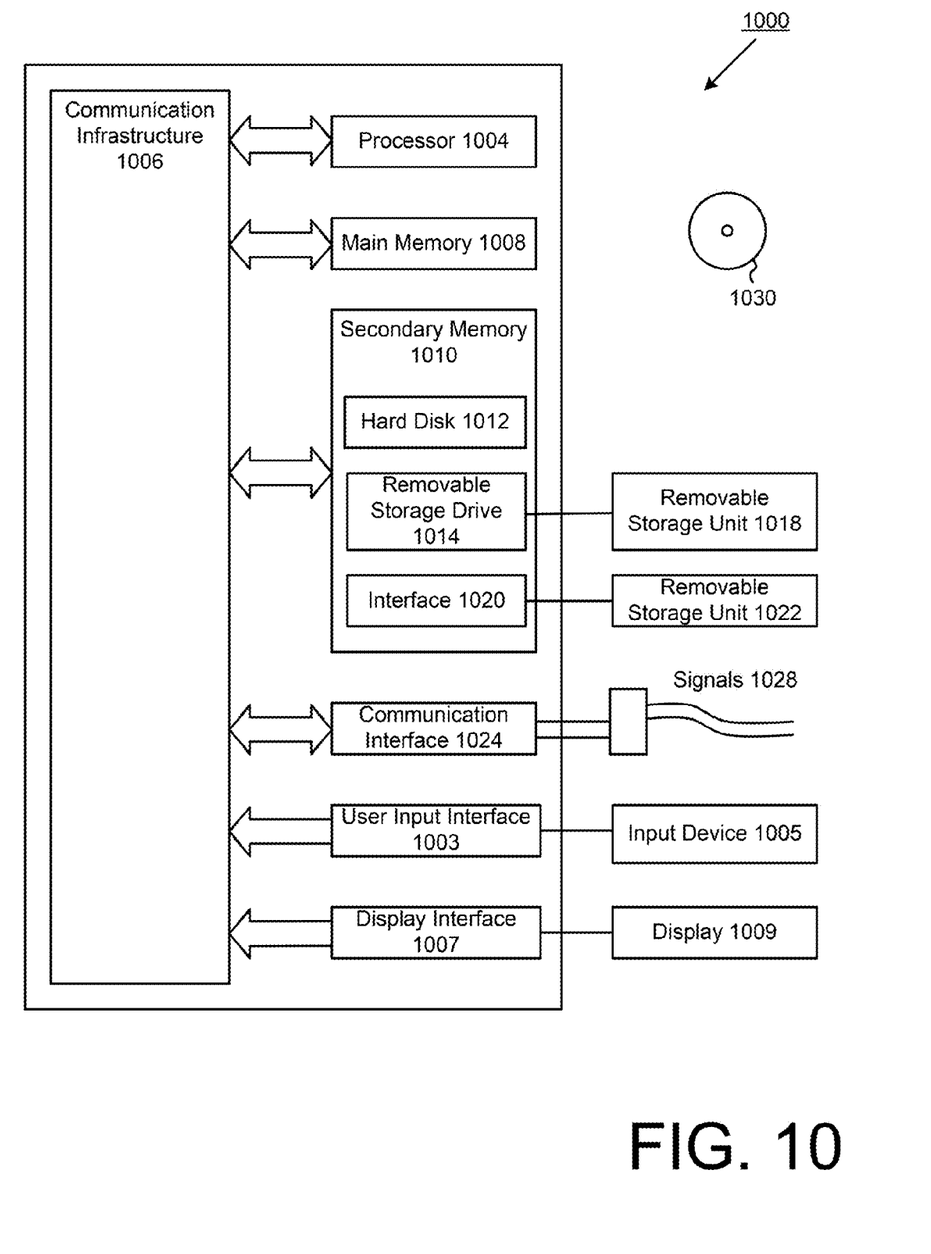
FIG. 10 is a block diagram of an example of a computer system on which one or more of the functions of the embodiments may be implemented.

The entities described herein, such as the sender and recipient devices 3 and the server 5, may be implemented by computer systems such as computer system 1000 as shown in FIG. 10. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternatives and Modifications

It will be understood that embodiments of the present invention are described herein by way of example only, and that various changes and modifications may be made without departing from the scope of the invention. In particular, it will be appreciated that aspects of the above discussed embodiments can be combined to form further embodiments. Yet further alternative embodiments may be envisaged, which nevertheless fall within the scope of the following claims.

The invention claimed is:

1. A method in which a data message comprising information content is transmitted from an instant messaging client on a user's device to a plurality of recipient devices, wherein the data message is received at a first device of the plurality of recipient devices after the data message is received at a second device of said plurality of recipient devices, and wherein said data message includes one or more message attributes which determine a display duration of the information content, the method comprising:

determining a message display start time that the data message can be displayed by each of the plurality of recipient devices, wherein the message display start time is equal to or after the time that the data message is received at the first device, and wherein none of the plurality of recipient devices reveals the information content prior to the determined message display time.

2. A method according to claim 1, wherein a message attribute that determines a lifetime of the received information content is the type of information contained, encryption key, decryption key, document, diagram, image, audio recording, video recording or other type of information.

3. A method according to claim 1, wherein a message attribute that determines a lifetime of the received information content is one or more of: the quantity of information contained in the data message, a parameter specifying a minimum or maximum lifetime, a geographic location of the sender, and an ID of the sender.

4. A method according to claim 1, wherein an attribute of a recipient's device that determines a lifetime of the received information content is one or more of: the ID of the recipient, an attribute derived from the ID of the recipient, and a geographical location of the recipient.

5. A method according to claim 1, further comprising determining that one or more recipients are online, and wherein a lifetime of the received information content is determined by the recipient's device.

6. A method according to claim 1, wherein at least one attribute of a recipient's device also determines a lifetime of the received information content.

7. A method according to claim 1, wherein a message attribute determines the length of time the received information content is displayed by the device to the recipient, and wherein the message display start time is determined from a time a decryption key is received, the decryption key to decrypt the received information content.

8. A method according to claim 1, further comprising determining that one or more recipients are offline and in response, storing the data message on one or more servers until: it is determined that the recipients become online and subsequently receive the data message sent by said servers, whereby the lifetime of the received information content is determined by the recipient's device; or it is determined that the data message is stored on a server for a period of time that exceeds the determined lifetime of the received information content, whereby said information content is deleted from the server.

9. A method according to claim 1, wherein the message attributes which determine a lifetime of the received information content are decrypted by the sender by using the sender's private key prior to the data message being sent, such that the transmitted data message comprises decrypted message attributes, and in which the recipients of the received data message encrypt the decrypted message attributes using the sender's public key in order to authenticate the message attributes which determine the lifetime of the received information content.

10. The method of claim 1, further comprising:
determining, by the user device, that output of a portion of the information content of the data message has occurred and, in response, starting a countdown of the display duration; and
displaying, by the user device, an indication of the countdown.

11. A method according to claim 10, wherein the instant messaging clients are configured to determine that the data message is expired based on the defined display duration, and to remove the content portion of the expired data message from memory.

12. A method according to claim 10 wherein the sender, based on a sent message time attribute sends a command message to recipients of said message to cause deletion of said message information from recipients' devices.

13. A method according to claim 10, wherein the instant messaging clients comprise a user interface configured to display a plurality of sequential data messages of a conversation, wherein a footprint of an expired data message is retained in the displayed conversation.

14. A method according to claim 10, wherein the data message is transmitted from the instant messaging client at the user device of the first user to an instant messaging client at a user device of a third user.

15. A method according to claim 14, wherein synchronisation of the remaining display duration at all of the instant messaging clients is maintained by a remote messaging server.

16. A method according to claim 10, wherein the determined output comprises at least one selected from the group consisting of: displaying the content portion in a message display region of the instant messaging client, initiating playback of an audio or multimedia content portion, and determining that playback of an audio or multimedia content portion has finished.

17. A method according to claim 10, wherein the content portion of the data message comprises one or more of: text data, image data, audio data, video data and encoded data, or combinations thereof.

18. A method according to claim 17, further comprising determining a data type of the content portion of the data message, wherein the display duration of the content portion is determined based on the data type.

19. A method according to claim 18, wherein:
when the data type includes text and/or image data, the a countdown of the display duration of the content portion is started only after the content portion is displayed and appears on a screen of the user device; and
when the data type includes audio and/or video data, the countdown of the display duration of the content portion is started only after play back of the content portion is initiated by the user device.

20. A method according to claim 1, wherein the step of determining the message display start comprises:
determining a time that each of the plurality of recipient devices is online; and
determining the message display start time based upon the time that each of the plurality of recipient devices is online.

21. A method according to claim 1, further comprising:
receiving, at the user's device, a subsequent data message comprising information content sent by the first device of the plurality of recipient devices, wherein the subsequent data message is received at the first device after the data message is received at the user's device;
determining a subsequent message display start time that the data message can be displayed by each of the plurality of recipient devices and the user's device, wherein the subsequent message display start time is equal to or after the time that the subsequent data message is received at the first device, and wherein none of the plurality of recipient devices and the user's device reveals the information content of the subsequent data message prior to the determined subsequent message display time.

22. A method according to claim 1, wherein the step of determining the message display start time comprises:
calculating the message display start time based at least in part upon an absolute time at which the information content is sent to the plurality of recipient devices.

23. A server comprising:
a computer-readable memory; and
at least one hardware processor configured to:
transmit a data message comprising information content to a plurality of recipient devices, wherein the data message is received at a first device of the plurality of recipient devices after the data message is received at a second device of the plurality of recipient devices, and wherein the data message includes one or more message attributes which determine a display duration of the information content; and
determine a message display start time that said data message can be displayed by each device of the plurality recipient devices, wherein the message display start time is equal to or after the time that the data message is received at the first device, and wherein none of the plurality of recipient devices reveals the information content prior to the determined message display time.

24. A non-transitory storage medium comprising machine readable instructions stored thereon for causing a computer system to perform a method in accordance with claim 1.

\* \* \* \* \*